US009372932B2

(12) United States Patent
Freed

(10) Patent No.: US 9,372,932 B2
(45) Date of Patent: Jun. 21, 2016

(54) METHOD FOR RESTRICTING ACCESS TO DATA BASED ON CURRENT WORK

(76) Inventor: Sam Freed, Jerusalem (IL)

( * ) Notice: Subject to any disclaimer, the term of this patent is extended or adjusted under 35 U.S.C. 154(b) by 584 days.

(21) Appl. No.: 13/481,985

(22) Filed: May 29, 2012

(65) Prior Publication Data

US 2012/0303666 A1    Nov. 29, 2012

Related U.S. Application Data

(60) Provisional application No. 61/491,204, filed on May 29, 2011.

(51) Int. Cl.
*G06F 17/30* (2006.01)
(52) U.S. Cl.
CPC ................... *G06F 17/30873* (2013.01)
(58) Field of Classification Search
USPC ............. 707/999.001, 2, 9, 781–788
See application file for complete search history.

(56) References Cited

U.S. PATENT DOCUMENTS

| | | | |
|---|---|---|---|
| 2005/0149726 A1* | 7/2005 | Joshi et al. | 713/164 |
| 2006/0022048 A1* | 2/2006 | Johnson | 235/462.1 |
| 2006/0074989 A1* | 4/2006 | Laborczfalvi et al. | 707/200 |
| 2009/0228774 A1* | 9/2009 | Matheny et al. | 715/201 |
| 2010/0024036 A1* | 1/2010 | Morozov et al. | 726/26 |
| 2011/0055309 A1* | 3/2011 | Gibor et al. | 709/202 |
| 2012/0066223 A1* | 3/2012 | Schentrup et al. | 707/737 |
| 2012/0079423 A1* | 3/2012 | Bender et al. | 715/804 |
| 2013/0160072 A1* | 6/2013 | Reus et al. | 726/1 |
| 2013/0205366 A1* | 8/2013 | Luna et al. | 726/1 |

OTHER PUBLICATIONS

Awin Agah et al., Taxonomy of Research on Human Interactions with Intelligent Systems, 1999, IEEE, 965-970.*

* cited by examiner

*Primary Examiner* — Jean B Fleurantin
(74) *Attorney, Agent, or Firm* — Mark M. Friedman

(57) ABSTRACT

A system and method for presenting a user with only data relevant to a task on which the user is currently working, while preventing display and other data from other tasks from intruding on a user's work environment. Conventional tagging is replaced and/or supplemented by a centralized method for creating, managing, and applying categories that does not require display space in individual applications for user interaction. Data access and display can be controlled across all applications, allowing the user to concentrate on a particular issue or project without being distracted or wasting display-space on information that is not relevant to the current issue or project on which a user is working.

21 Claims, 3 Drawing Sheets

US 9,372,932 B2

METHOD FOR RESTRICTING ACCESS TO DATA BASED ON CURRENT WORK

CROSS-REFERENCE TO RELATED APPLICATIONS

This application claims the benefit of provisional patent application (PPA) Ser. No. 61/491,204, filed May 29, 2011 by the present inventors, which is incorporated by reference.

FIELD OF THE INVENTION

The present invention generally relates to human machine interfaces, and in particular, it concerns restricting access to data based on a user's current work.

BACKGROUND OF THE INVENTION

There are far too many distractions for users working on modern computer systems. Even without outright distractions like advertisements on web pages, the fact that so many different aspects of our lives are present on the screen creates distractions for the user trying to focus on a task at-hand.

There is therefore a need for a method and system for providing a user with only data relevant to a task on which the user is currently working, while preventing display and other data from other tasks from intruding on a user's work environment.

SUMMARY

According to the teachings of the present embodiment there is provided a system including: a processing system including at least one processor and configured for receiving one or more selected categories; and notifying, in response to receiving of the selected categories, one or more applications, to restrict interactions of each application with a user to only data associated with the selected categories.

In an optional embodiment, the processing system is further configured to notify two or more applications.

In another optional embodiment, the processing system is further configured for: providing a set of categories for presentation to the user, and a user selection from the presentation provides the selected categories from the set of categories. In another optional embodiment, the processing system is further configured to notify one or more applications at least in part by pushing the selected categories to one or more applications. In another optional embodiment, the processing system is further configured to notify one or more applications at least in part by posting the selected categories for one or more applications to access.

In another optional embodiment, restricting interaction includes each of the applications displaying on a computer user interface only data associated with the selected categories. In another optional embodiment, notifying includes signaling one or more applications, each of the applications having an associated human machine interface (HMI), to restrict interactions of each applications via the associated HMI with the user to only data associated with the selected categories.

In another optional embodiment, the selected categories are selected from the group consisting of: private, personal, public, work, project 1, project 2, hobby1, hobby2, not public, a category defined by the user, and a Boolean combination of existing categories.

In another optional embodiment, one or more applications are selected from the group consisting of: electronic mail (email), photograph processing, phone book, phone or other communications system, document composition, presentation production, spreadsheet, billing system, and a time management system.

In another optional embodiment, the data is selected from a group consisting of: video display components, electronic mail (emails), photographs, contacts, documents, presentations, spreadsheets, interne browser data, phone calls, calendar appointments, meeting reminders, audio recordings, video recordings, diagrams, schemas, and plans.

According to the teachings of the present embodiment there is provided a method for controlling interactions between a user and a human machine interface (HMI) including the steps of: receiving one or more selected categories, and notifying, in response to receiving of the selected categories, one or more applications, each of the applications having an associated human machine interface (HMI), to restrict interactions of each application via the associated HMI with the user to only data associated with the selected categories.

In another optional embodiment, the step of notifying is to two or more applications.

Another optional embodiment includes the step of presenting a set of categories to the user allowing the user to select the selected categories from the set of categories.

In another optional embodiment, the receiving is of a selection by the user from a presentation of a set of available categories. In another optional embodiment, the notifying includes pushing the selected categories to one or more applications. In another optional embodiment, the notifying includes posting the selected categories for one or more applications to access. In another optional embodiment, restricting interaction includes each of the applications displaying on a computer user interface only data associated with the selected categories.

According to the teachings of the present embodiment there is provided a system including: a processing system including at least one processor and configured for preparing one or more categories for transfer to one or more applications, and providing the one or more categories to the applications.

According to the teachings of the present embodiment there is provided a method for controlling interactions between a user and a human machine interface (HMI) including the steps of preparing one or more categories for transfer to one or more applications, and providing the one or more categories to the applications.

According to the teachings of the present embodiment there is provided a system including: a processing system including at least one processor and configured for receiving one or more selected categories, and restricting interactions with a user to only data associated with the one or more selected categories.

In another optional embodiment, the processing system further includes one or more applications configured for receiving the selected categories, each of the applications having an associated human machine interface (HMI), and configured to restrict interactions of each applications via the associated HMI with the user to only data associated with the selected categories According to the teachings of the present embodiment there is provided a method for controlling interactions between a user and a human machine interface (HMI) including the steps of: receiving one or more selected categories by one or more applications, each of the applications having an associated human machine interface (HMI), and restricting interactions, in response to receiving of the selected categories, of each application via the associated HMI with the user to only data associated with the selected categories.

In another optional embodiment, the step of receiving is by two or more applications.

According to the teachings of the present embodiment there is provided a system including: a processing system including at least one processor and configured for checking if a new set of selected categories is available, and if the new set of selected categories is available: restricting interactions with a user to only data associated with the new set of selected categories.

In another optional embodiment, the processing system further includes one or more applications configured for receiving the selected categories, each of the applications having an associated human machine interface (HMI), and configured to restrict interactions of each applications via the associated HMI with the user to only data associated with the selected categories According to the teachings of the present embodiment there is provided a method of configuring an application including the steps of: checking by an application if a new set of selected categories is available, and if the new set of selected categories is available: restricting, by the application, interactions of the application with a user to only data associated with the selected categories.

According to the teachings of the present embodiment there is provided a computer-readable storage medium having embedded thereon computer-readable code for controlling interactions between a user and a human machine interface (HMI) the computer-readable code including program code for: receiving one or more selected categories, and notifying, in response to receiving of the selected categories, one or more applications, each of the applications having an associated human machine interface (HMI), to restrict interactions of each application via the associated HMI with the user to only data associated with the selected categories.

According to the teachings of the present embodiment there is provided a computer-readable storage medium having embedded thereon computer-readable code for controlling interactions between a user and a human machine interface (HMI) the computer-readable code including program code for: preparing one or more categories for transfer to one or more applications, and one or more categories to the applications.

According to the teachings of the present embodiment there is provided a computer-readable storage medium having embedded thereon computer-readable code for controlling interactions between a user and a human machine interface (HMI) the computer-readable code including program code for: receiving one or more selected categories by one or more applications, each of the applications having an associated human machine interface (HMI), and restricting interactions, in response to receiving of the selected categories, of each application via the associated HMI with the user to only data associated with the selected categories.

According to the teachings of the present embodiment there is provided a computer-readable storage medium having embedded thereon computer-readable code for configuring an application, the computer-readable code including program code for: checking by an application if a new set of selected categories is available, and if the new set of selected categories is available: restricting, by the application, interactions of the application with a user to only data associated with the selected categories.

BRIEF DESCRIPTION OF FIGURES

The embodiment is herein described, by way of example only, with reference to the accompanying drawings, wherein.

DETAILED DESCRIPTION

The principles and operation of a method according to a present embodiment may be better understood with reference to the drawings and the accompanying description. The present invention is a method for selecting a category of interest to a user, providing to the user only data associated with the category, and/or preventing data from other (non-selected) categories from being presented to the user. The system facilitates control of data on a system level, across all applications, without intruding on a user's work environment, or taking additional workspace from applications.

An embodiment of a ClearDesk module facilitates presenting a user with only data relevant to a task on which the user is currently working, while preventing display and other data from other tasks from intruding on a user's work environment. Conventional tagging is replaced and/or supplemented by a centralized method for creating, managing, and applying categories that does not require display space in individual applications for user interaction. Data access and display can be controlled across all applications, allowing the user to concentrate on a particular issue or project without being distracted or wasting display-space on information that is not relevant to the current issue or project on which a user is working.

Figure 1:
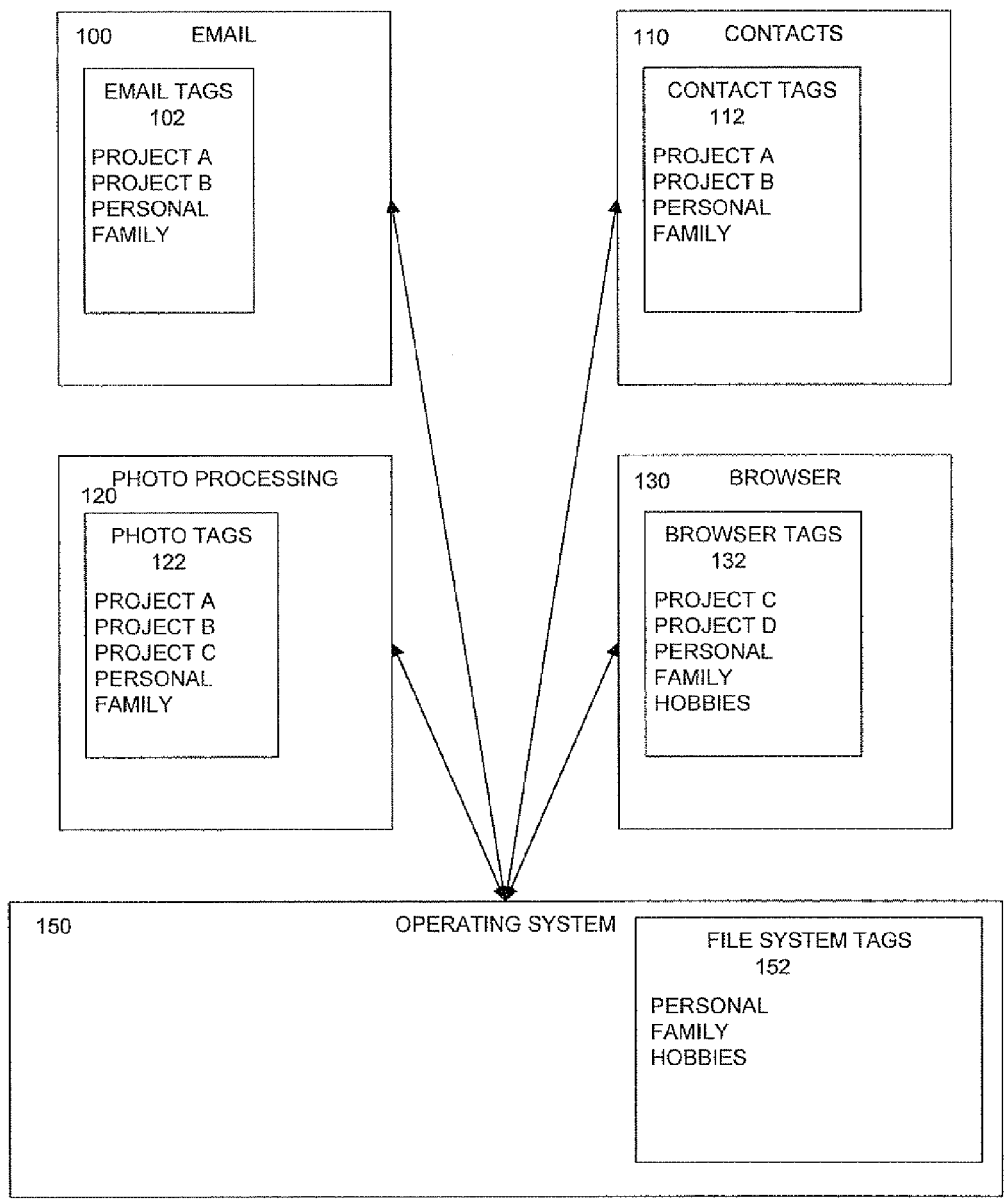
FIG. 1 is a sketch of conventional data management and tagging.

Referring now to the drawings, FIG. 1 is a sketch of conventional data management and tagging. Tagging is one conventional technique for trying to provide a user with data relevant to a task on which the user is currently working. In the context of this document, the terms "tag", "tagging", and similar variations are generally used to refer to conventional methods of data organization, in comparison to the term "category" that is described below in reference to the innovative method of the current embodiment. One skilled in the art will realize that the term "tagging" refers to a variety of conventional implementations. In conventional systems, a variety of applications run under an operating system 150, and each application has a tagging feature for that application. In the example of the current figure, applications such as email 100, contacts/phonebook 110, photo processing 120, and browser 130 each have independent tagging functions, respectively email tags 102, contact tags 112, photo tags 122, and browser tags 132. Note that the tags in each application may be the same, different, and/or partially overlapping. For example, email tags 102 are the same as contact tags 112—"project A", "project B", "personal", and "family". Photo tags 122 has a "project C" tag that is in addition to the same tags as in email tags 102 and contact tags 112. Browser tags 132 do not include "project A" and "project B", but does include a tag for "project D" and "hobby". Tagging includes selecting a tag and associating the tag with data, (for example, choosing a tag name and then dropping the tag name on/clicking on a file to be tagged), selecting data and associating the data with a tag (for example, choosing a file, then selecting a tag for the file from a menu of available tags), and tagging by sorting (for example, when a file is placed in a folder with a given name, the name can be considered a tag for the data in the folder).

Note that while the names of the tags in each application may be the same, there is no connection between the tags in different applications. Each application must have the tags for that application set up (by a user and/or administrator) independently from the other applications. A similar tagging feature exists in the file-system for documents (folders) and in the web-browser for bookmarks/favorites (and recently for browser tabs). For example, file system tags 152 has "personal", "family", and "hobby". Hence, the file system can be considered as just another application with regard to tagging, and in general with regard to data access and display. Note in FIG. 1 the arrows show bi-directional connections between the applications (100, 110, 120, and 130) and the operating system 150, as is commonly known in the art for services provided by an operating system to applications. There is no connection between tags (102, 112, 122, 132, and 152).

In conventional systems, in addition to each application having a tagging feature, each application has a selection or filtering feature for that application. Filtering includes selecting a tag in an application using the application's interface for tag (filter) selection, and results in the correspondingly tagged data being provided to the user for that application. This providing can be via a variety of techniques, depending on the application. Untagged data may or may not also be shown/provided to the user. Not all applications have the same tags, creating a new tag in one application does not affect another application, each application has a different interface for administrating tags, and each tag requires separate management. In addition, each application uses display space to allow the user to do tagging and tag selection (filtering). The display space required in each application for tag management and filter selection is an unwanted distraction to a user trying to concentrate on a given task (and associated data tagged for that task).

Another conventional technique for trying to provide a user with data relevant to a task on which the user is currently working is the use of applications that try to "catch" unwanted data and prevent the data from being displayed to the user. For example, while using an internet browser, programs are available to "prevent unwanted popups", or otherwise stop advertising from being displayed to the user. This technique is not sufficient, as techniques such as this are limited to specific applications, and are generally not controllable by users. For example, products such as Ad Block Plus™, while controllable by a user to select a degree of filtering, are not controllable with regards to categories created by the user (for use by the user across applications).

Another conventional technique is the use on some systems of multiple "virtual desktops", wherein application-windows can be distributed among the virtual desktops, and when a desktop is chosen for display, only the windows that had been put on that desktop are displayed. This technique is also not sufficient, as often a particular application needs to be used on multiple desktops, and any application window often contains multiple types of tagged data for diverse projects.

The above conventional techniques are not adequate solutions for the demands of users, and in particular for users of modern computer systems.

The current embodiment provides a user with only data relevant to a task on which the user is currently working, while preventing display of other data from other tasks from intruding on a user's work environment. Conventional tagging is replaced and/or supplemented by a centralized method for creating, administrating, and managing categories that do not require space in individual applications for user interaction. Data access and display can be controlled across all applications, allowing the user to concentrate on a particular issue or project without being distracted by data, displays, or wasting display-space on information that is not relevant to the current issue or project on which a user is working.

In general, a method for accessing data includes selecting a category, initiating notification of the category selected to one or more applications, and providing, by each application, a user with data associated only with the selected category. In the context of this document, the term "category" is used with the innovative method of the current embodiment, in comparison, to the term "tagging" that is generally used to refer to conventional methods of data organization. Categories include arbitrary designators, normally words, describing activities, projects, and/or areas of interest to one or more users. Categories are selected via a centralized selection module, referred to in the context of this document as ClearDesk. Categories that have been selected are referred to in the context of this document as "selected category", "selected categories", or "selections". Categories can be unique identifiers (typically names) or a Boolean combination of tags, unique identifiers, and/or categories. Depending on the application, tags and categories can by mutually exclusive, or non-exclusive. For example, sorting files into folders is mutually exclusive—a file can be in one folder or another folder, but not both folders, so the file can be considered to have a mutually exclusive tag of the name of the folder into which the file has been sorted (examples can be seen in the operations of Windows™ or Yahoo™ email). In comparison, for example, emails can be labeled with multiple tags, a single email having more than one tag and is thus non-exclusively tagged (see example of Gmail™ email labeling). Optionally, the selected categories can be a range(s) of categories and/or regular expressions of categories.

The innovative ClearDesk module receives a category from a user and in response to receiving of the category that the user has selected, notifies one or more applications to restrict interaction with the user to only data associated with the category. ClearDesk facilitates simultaneous configuring from a centralized module of multiple applications to display, hide, and/or or restrict data. ClearDesk can facilitate both a "positive" and "negative" aspect of participating applications. Positive in the sense of only displaying data associated with a chosen (selected) category, in other words "show what the user wants". Negative in the sense of restricting display of data not associated with a chosen category, in other words, "do not show the user anything the user has not selected". This affects the display of non-categorized data, if such data exists.

In other words, ClearDesk allows a user to tell a computer system that the user wants to work only on "project A", and so temporarily make everything else "go away". An alternative description of ClearDesk is that ClearDesk can be a conceptual opposite of conventional systems for searching (for example, Google). The goal of a search system is to bring to a user anything that is associated with a topic, in contrast to ClearDesk that can be described as a system to keep away from a user anything that is not associated with the topic.

While the core functionality of ClearDesk includes receiving one or more selected categories, and in response notifying one or more applications of the selected categories, typically ClearDesk is implemented with additional steps. An initial step is the definition of categories, typically by a user and preferably using a definition module from ClearDesk. A second step is propagating the defined categories. Propagating includes preparing one or more categories for transfer to one or more applications and providing the prepared categories to the applications). Within each application, data is categorized (manually or automatically) with the centrally defined categories. When a user desires to work on a specific category, a ClearDesk can present a set of defined categories to the user. The user can select one or more categories from the presentation, to provide "selected categories". ClearDesk then notifies participating applications of the selected categories, and the applications restrict interactions of each application with a user to only data associated with the selected categories.

In the context of this document, although reference may be made to "a category" in the singular for clarity and simplicity of this description, category should generally be interpreted as including the possibility of multiple categories, in other words as "one or more categories". In general, ClearDesk can be used for data access and interaction with data. More specifically, implementations by applications are in a manner appropriate for that application. A typical implementation is display of data, in this case displaying only the data relevant to the selected category(ies), and in this description, the more specific "display", or "display of data" is often used for simplicity and clarity. Restricting interaction includes each of the applications displaying on a computer user interface only data associated with the selected category. Restricting interactions also includes providing data this is associated with one or more selected categories.

In the context of this document, although reference may be made to "computer", "system", or "computer system" for clarity and simplicity of description, these terms should be interpreted for any system of devices/services used by the same user. In the simplest case, computer can be one computer system (e.g. running windows) but in a more complex case, computer could also refer to an integrated set of devices, including: PC, cell phone, tablet, gaming console, telephony system, web-provided services ("cloud services"), and suchlike. The entire implementation of ClearDesk and applications associated with ClearDesk can be fully or partially network-based, that network being broad (like the Internet) or local (like Bluetooth).

Figure 2:
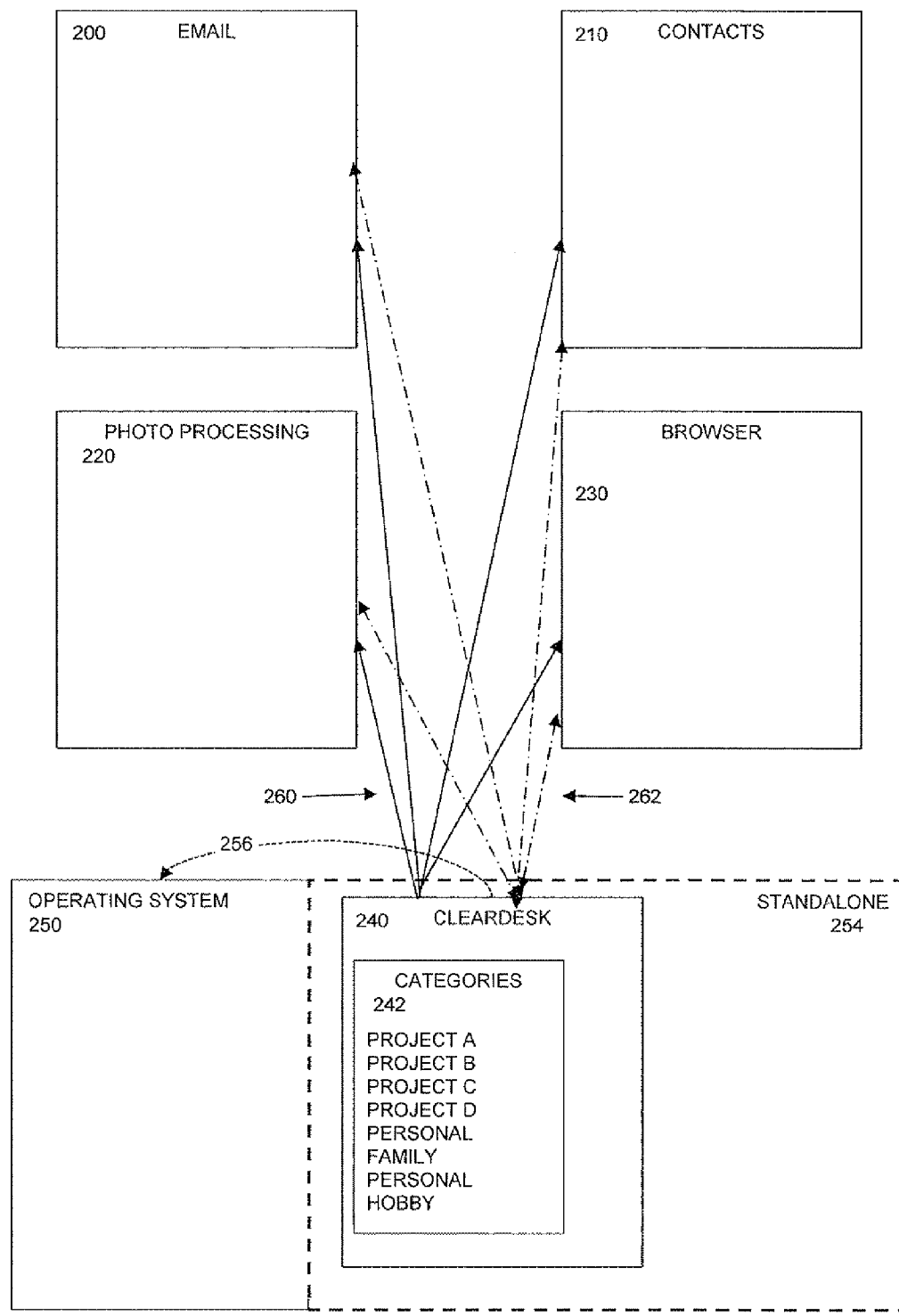
FIG. 2 is a sketch of the ClearDesk system.

Referring to FIG. 2, a sketch of the ClearDesk system, the ClearDesk module 240 contains categories 242 to be used by a user. Categories can be setup by one or more users, or system administrators, before or during use of a system by user(s). Typically categories 242 are setup using a function of the ClearDesk module 240, but this implementation is not limiting, and categories can also be setup by other techniques, for instance by loading a configuration file for ClearDesk, or as part of system configuration of a computer on which ClearDesk is or will be running. Categories can be designated on a per user, per group, per system (per computer), and/or per installation, basis. Categories can also be used in combination, for example categories that are configured by a company for the company's employees, available to everyone, and not able to be deleted by employees in combination with categories that can be created by an employee (and are only seen by that employee). In other words, the categories can be partially predefined, and optionally protected from change, by a privileged user and/or system. Predefined and/or company-wide categories can be used by a company (management staff of the company) to provide an indication of an amount of time the company's employees are spending on various tasks (the tasks corresponding to associated categories). As will be obvious to one skilled in the art, implementations of category selection and category representation can depend on the specific work environment in which ClearDesk is being used. Categories can represent a one-to-one mapping of the category selected to the restrictions, or a category can represent more than one resulting restriction. Implementations includes, but are not limited to nesting, hierarchical, selection of multiple categories, non-exclusive categories, all categories, no categories, only uncategorized data, or "not" categories (everything except the category selected), pattern-matching of categories, and range selection (e.g. Project 1-7).

When using ClearDesk, categorizing of data still needs to be done prior to using selected categories to display and restrict the data. Categorizing can be done manually, for example by a user, or preferably automatically, for example by the system based on key words in the data. A feature of using ClearDesk is that every participating application can have at least the same categories, in this case category names, to use to categorize the data. Automatic filters can also be used to categorize data with the defined categories (category names).

In the context of this document, the term "applications" generally refers to applications that have been designed for interoperability with ClearDesk. The term "applications" can generally be replaced in this description with the term "participating applications" when referring to applications in the context of ClearDesk. When specifically referring to applications that do not interoperate with ClearDesk, the term "non-participating application" is generally used. One skilled in the art will realize from the context in which the term "application" is used if the user refers to a participating or non-participating application.

Typically, receiving a selected category is the result of a user using ClearDesk to select a category from a presentation of available categories. In response to receiving a selected category from a user, ClearDesk notifies the applications of the selected category (one or more) that should be used to restrict interaction with the user to only data associated with the selected category. As will be obvious to one skilled in the art, notifying is initiated by ClearDesk, and can be implemented using a variety of known techniques. Notifying may succeed or fail depending on the state of the system and the operating state of applications. A popular technique for notification is known as "pushing", in which ClearDesk contacts the participating applications and transfers information regarding the selected category selection to the application. Another popular technique is known as "publishing" (or "posting"), in which ClearDesk transfers information regarding the selected category to a known location, and participating applications are configured to check, as needed, the known location. Alternatively, a "pulling" technique can be used, such as when an application needs to check for categories or selected categories, the application can contact ClearDesk and request the currently defined categories and/or currently selected category.

While ClearDesk can notify one application, in a typical operating scenario, ClearDesk notifies at least two or more applications, preferably a multitude of applications. Of course ClearDesk can be running, but not notify any (notify zero) applications. Alternatively, ClearDesk can notify a subset of applications on the system.

The ClearDesk module can be implemented in a variety of ways, depending on the specific requirements for use, as shown by the standalone box 254. In one implementation, ClearDesk is a stand-alone software component and the dashed standalone box 254 is a separate element from operating system 250. In this implementation, ClearDesk interacts with the applications on the computer (directly). A preferable implementation is to deploy ClearDesk as part of a specifically privileged software-component, for example as part of a "display manager", "operating system", or similar system component. In this implementation, the dashed standalone box 254 is normally considered part of the operating system 250. The system on which ClearDesk operates is typically a computer, but can also be a controller, or the ClearDesk module can run on a controller and notify applications on the controller or on another controller or computer.

Figure 3:
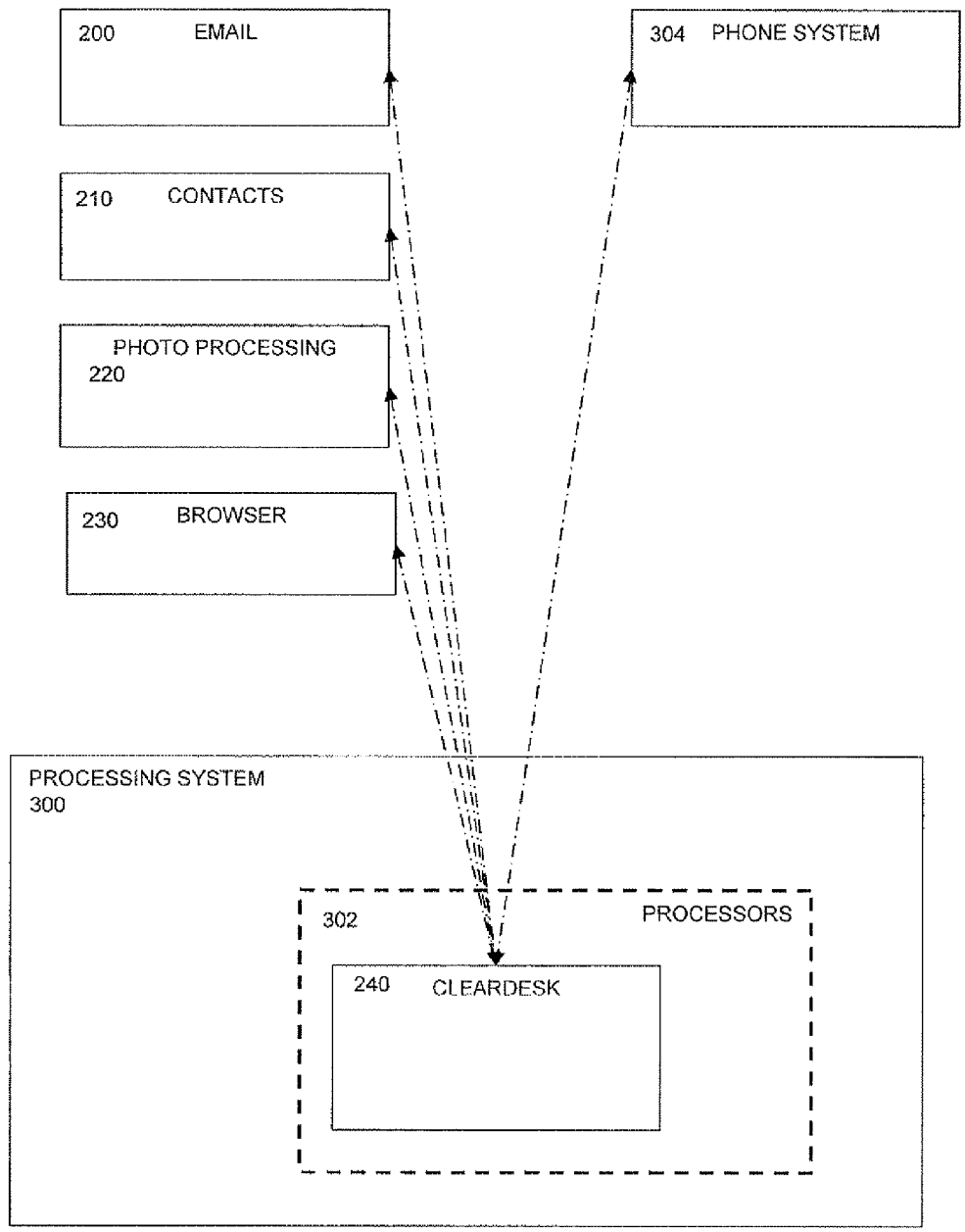
FIG. 3 is a diagram of an implementation of ClearDesk.

Referring to FIG. 3, a diagram of an implementation of ClearDesk, in general, a processing system 300 including at least one processor 302 is configured to run the ClearDesk module 240. The processing system, in this case ClearDesk, is configured for receiving one or more selected categories. In response to receiving of the selected categories, one or more applications (200, 210, 220, 230) and/or devices (phone system 304) are notified to restrict interactions of each application with a user to only data associated with the selected categories. A typical implementation includes running on the processing system one or more modules to receive one or more selected categories and notify one or more applications. Typically, the processing system is configured to notify two or more applications. The processing system can further configured to use ClearDesk to provide a set of categories for presentation to the user. The user selects one or more categories from the presentation of categories, and the selected categories are received by ClearDesk. Typically, each of the applications being notified has an associated human machine interface (HMI). Notification facilitates restricting interactions of each application via the associated HMI with the user to only data associated with the selected categories.

In general, a method for controlling interactions between a user and a human machine interface (HMI) includes ClearDesk receiving one or more selected categories. In response to receiving of the selected categories, ClearDesk notifies one or more applications of the received selected categories. Each of the applications has an associated human machine interface (HMI). Based on the notification, each application restricts interactions of each application via the associated HMI with the user to only data associated with the selected categories.

Note in FIG. 2 the arrows show unidirectional connections from ClearDesk 240 to the applications (email 200, contacts 210, photo processing 220, browser 230), as shown by unidirectional arrows 260. In the case where ClearDesk is standalone, the operating system 250 is a separate element from the standalone 254 and arrow 256 is used as a connection from ClearDesk 240 to the operating system 250. Categories and selected categories can be stored globally, as shown by categories 242 as part of ClearDesk 240, and no categories shown in the applications (200, 210, 220, and 230). Alternatively, the copies of the categories 242 can be stored in one or more of the applications (not shown). Although the arrows in FIG. 2 are shown in a preferred implementation of unidirectional connections (unidirectional arrows 260) from ClearDesk 240 to the applications, one skilled in the art will realize that bi-directional connection is possible, with feedback from applications to ClearDesk, possibly with subsequent propagation to the other applications, as shown by the dashed bi-directional arrows 262.

In a non-limiting example, ClearDesk can be implemented on a personal computer, in a remote system (for example web-based or other "Cloud" system, such as Google's "docs" or "g.ho.st"), or on a hand-held device (for example a smartphone.). At a desktop level (for example, a computer running Windows, OS/X, gnome, KDE, etc., or running remotely on a network (for example, as in "cloud computing" e.g. Google does), or in a hand-held or mobile device (for example smartphones) the ClearDesk module can be accessed by a user. A popular method of access is to use an icon in a tray to access ClearDesk (similar to how keyboard layouts are selected) that can open (right-click) a generic category manager. As the tray is built into the user interface of the operating system, the icon tray is generally always on the screen, so does not require additional space in each application for access to category selection and management. The category manager can be used to select (one or more depending on the implementation) categories. Optionally color, icons, and other user interface components can be used to distinguish the different categories, or sets of categories. In an exemplary category manager sub-module of ClearDesk, a user can add/remove/edit user-defined categories, optionally with some default categories (for example, work/family/personal) pre-defined.

Examples of selection of categories include:
selecting a category of "project A", and the participating applications only showing data that has been previously tagged with "project A";
selecting a category of "project D" which has been configured to notify applications to restrict interaction to only data previously tagged with "project B" and "project D" (nested categories);
selecting "work" which restricts to only emails with project file numbers in the subject heading, or depending on the application running a filter which restricts to only emails with project file numbers as keywords for a search of emails;
selecting "not work", which allows everything except work related data, in other words restricts to all categories other than "work";
selecting "everything", which selects all categories (so only untagged data is not displayed); and
selecting "off", which turns off filtering (allows display of all data).

Example of projects and areas of work that can be used as categories include, but are not limited to private, personal, public, work, a first category, a second category, a third and fourth categories, and not a fifth category.

Examples of applications include, but are not limited to electronic mail (email), photograph processing phone book, document composition, presentation production, and spreadsheet.

Examples of data include, but are not limited to video display components (such as windows of modern graphical user interfaces), electronic mail (emails), photographs, contacts, documents, presentations, spreadsheets, internet browser data, phone calls, calendar appointments and meeting reminders.

After categories have been defined, categories can be bundled and sent to participating applications. To provide categories to applications, ClearDesk can prepare one or more categories for transfer to one or more applications and then provide the prepared categories to the applications. Preparation of categories facilitates ClearDesk notifying an application when the application starts, wakes up, or otherwise is in an operational state where category update is appropriate. In general, ClearDesk implements a method for controlling interactions between a user and a human machine interface (HMI) by providing one or more prepared categories to applications, each of the applications having an associated human machine interface (HMI).

Applications that are designed for interoperability with ClearDesk include functionality to receive notifications of selected categories from ClearDesk (via push, publication, pull, etc., as described above) and functionality to display, hide, and/or restrict data based on the received selected categories. Typically, two or more applications receive notifications from ClearDesk. The notification includes one or more selected categories. In other words, to restrict interactions with a user to only data associated with the received one or more selected categories. In general, each of the applications has an associated human machine interface (HMI), and is configured to restrict interactions of each application via the associated HMI with the User to only data associated with the selected categories of which the application has been notified.

In a case where an application is providing a selected category to ClearDesk (for example a caller-id application that notifies ClearDesk of a selected category, and ClearDesk subsequently notifies other applications of the selected category) the application does not necessarily need to accept notifications of selected categories from ClearDesk. However, in the current example, a caller-id function is generally part of a phone application and/or phone system 304, which could receive categories and notifications of selected categories from ClearDesk and allow/restrict the phone from ringing based on the selected category. Preferably, the phone/caller-id system 304 should include the functionality to receive a set of categories from ClearDesk (to use for notifications back to ClearDesk), and the functionality to receive new/updated sets of categories, as appropriate for the application. This bi-directional feature between ClearDesk and applications is shown in FIG. 2 by dashed bi-directional arrows 262, and in FIG. 3 by the dashed bi-directional arrow between ClearDesk 240 and phone system 304. In the case where ClearDesk is receiving from an application and/or device, the "selected category" can be from a function within the application, or from a user selection from within the application. In the above phone system example, caller-id is function within the phone system application that facilitates selection of a category. In another example, a selection module within an application may present a set of categories to a user, allowing the user to select one or more categories, and then providing the selected category to ClearDesk for propagation to other applications.

A set of categories can include one or more categories. On startup, wakeup, installation, configuration, and/or as appropriate to the functioning of an application, an application can request, or check if a new set of categories and/or selected categories are available. In this case, an "old set" of categories refers to a set of categories previously or currently associated with an application, and a "new set" of categories is received by the application via notification from ClearDesk. In a case like application installation, the old set of categories will be empty or non-existent. Obviously, if there has been no change to the categories and/or selected categories since the old set was received, the new set and old set will be the same set of categories. Depending on the application and operating environment, a check can be made to see if a new set of categories is different from an old set of categories, and a decision made as to whether to notify and receive the new set of categories.

In general, a method for configuring an application includes receiving one or more selected categories and restricting interactions with a user to only data associated with the one or more selected categories. Optionally, the method includes checking (requesting) by an application whether a new set of categories is available and if the new set of selected categories is available, the application restricts interactions with a user to only data associated with the new set of selected categories. In general, each of the applications has an associated human machine interface (HMI), and is configured to restrict interactions of each application via the associated HMI with the user to only data associated with the received new set of selected categories. Depending on the application and user preferences, the application can actively (all the time) restrict interactions, or alternatively restrict interactions only when notified by ClearDesk (pull/push implementation).

If an application is not running, or is not active, the application does not yet have to be notified of selected categories. When an application starts, or becomes active, the application can check for waiting notifications (being "pushed"), access published categories (when "publishing" is being used), or request current selected categories from ClearDesk (using "pulling"). Based on this description, one skilled in the art will be able to select or design a technique for notification and/or request of categories from ClearDesk to applications at appropriate times.

Depending on the specifics of the system and an application, the application can be notified of selected categories, but choose not to comply. Alternatively, at least one application restricts interaction. Applications can also be designed to override category and/or selected category notification, for example settings by the user or system administrator to always show immediately certain system alerts (Fire! Evacuate building!), or use settings to always be notified of all calendar reminders. Preferably, applications like calendars can have an internal user setting allowing the user to select whether they should receive reminders outside a selected category, and if so, which local categories (internal to the application) should override categories (system or global categories, as generally defined for ClearDesk).

The action for each participating application to take with uncategorized data can be defined within each participating application, or one or more general rules can be defined in ClearDesk, and the participating applications can be notified of the defined rules. Rules include, but are not limited to displaying all uncategorized data, and preventing uncategorized data from being displayed. For example, in an email application, a user may desire uncategorized emails to be displayed as they arrive so the user will receive emails that are relevant to the category on which the user is working. Another example is a photo processing application, in which a desirable setting may be to not display any photos that have not already been categorized for the current task.

Selected categories are typically received from a user, but ClearDesk is not limited to user input, and categories and selected categories can be received from other modules, including, but not limited to software, hardware, and firmware. In one implementation, user and/or system activity is monitored by ClearDesk or another module, and based on the activity, a category is selected, or received by ClearDesk. For example, a user receives a phone/video call on the user's computer. Based on caller-id, ClearDesk receives from the phone/video application information on the caller and/or the category associated with the caller, and proceeds with notifying of the category to the applications.

Optional features, such as a timing/logging system can be added to record how much of the user's time was spent in each of the categories. This can be linked to a billing system, for example for lawyers, consultants, etc. where selection of a category notifies a billing application, and the billing application tracks the time spent with the category selected. Such a connection can make timekeeping and desk-management the same task, thus reducing overhead. Note that in a case where ClearDesk notifies an application that does not have a user interface, the notification can be used for functions within the application related to the selected categories. The notified application does not necessarily restrict interactions of the application with a user to only data associated with the selected category, as the application may not have a user interface. Systems, such as a timing/logging system and a billing system, receive notifications of a selected category from ClearDesk, and use the selected category internally to the application for performing functions of the application. The application can also use the selected category for interactions with other applications, and/or to restrict interactions of the application with other applications.

ClearDesk can be used to control other devices including, but not limited to modules, software, and systems, either through the notification feature, or via additional features, plug-ins, hooks, APIs, and similar known methods of command, control, and communication. Control can be simply notifying another application of a set of categories, or more complex aligning behavior of the application to the selected category. For example, controlling a phone, phone application, cell phone, voice mail system, etc.

Optionally, a setting can be provided as to which communications-systems (Email, chat, VoIP, telephony, etc.) should be allowed to alert the user about incoming communications, and whether to treat differently communications that are relevant to the currently selected category(s). The communications systems linked to the user's computer or the company's network, such as Skype, VOIP, email, "chat" systems, etc. can be linked to ClearDesk using the ClearDesk categories and notifications. This linking enables communications systems (and the corresponding applications for the communications systems) to use ClearDesk categories when sorting contacts, and configuring preferences such as "no interruptions", "only interrupt me with contacts that pertain to this category (project)", "only project+privileged categories (family, management, etc.").

ClearDesk can be used to control applications, devices, and in general any element that can accept a notification from ClearDesk (either directly or through an intermediate, network, API, etc.). In this case, ClearDesk can notify a device such as a phone system to accept/reject calls based on the current category selection. Notifying a device such as a tablet PC (personal computing device) of the current categories facilitates the tablet PC restricting interactions between the user and the tablet, or applications on the tablet. Notifying a user's cell phone of the selected categories facilitates (an application on) the cell phone screening phone calls and messaging, such as SMSs (short messaging service), to restrict phone calls and messaging to only allow phone calls and messaging associated with the selected category to be presented (in this case, ringing of the phone and displaying of messages received) to the user. Phone calls and messages that are not associated with the selected categories can be automatically routed to voice mail and inbox(es) for storage and later retrieval/display by the user.

ClearDesk can include internal or external triggers for selection of categories. An example of an "internal" trigger is a schedule of times of day, with categories pre-configured by a user for times of day, and then selection of pre-configured categories based on the time of day. "External" triggers include manual selection of categories, selection of categories based on time, and selection of categories based on location. Manual selection includes the above-described case of a user manually selecting one or more categories from a set of categories. Selection based on time includes a calendar application sending ClearDesk categories based on a calendar appointment and knowledge of current date and time. Selection based on location includes a location module, such as a GPS system sending ClearDesk a current location of a user. The current location of the user can be used by the location module to send a category to ClearDesk, or ClearDesk can use the location information to select appropriate categories. Another implementation of selection based on location includes an external trigger, such as a transmitter. The transmitter can be purpose-built for ClearDesk, inferred from sampling wireless networks available in the area of the user, or when accessing a facility/company sensing/as a result of near field communications for secure access to the facility. As described above, external triggers can be considered applications sending category(s) and/or information to ClearDesk, which ClearDesk can then use to notify participating applications of the selected categories. Note that any communications that are restricted from interaction with a user are still accepted and handled accordingly by the appropriate application. For example, emails are accepted and marked for the inbox, but not displayed to the user, phone calls are re-directed to voice mail, etc. This handling, accepting, re-directing, etc. saves the user from dealing with pop-ups (from the mail or chat system) and spurious phone calls.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

The use of simplified calculations to assist in the description of this embodiment should not detract from the utility and basic advantages of the invention.

Note that the above-described examples, numbers used, and exemplary calculations are to assist in the description of this embodiment. Inadvertent typographical and mathematical errors should not detract from the utility and basic advantages of the invention.

The choices used to assist in the description of this embodiment should not detract from the validity and utility of the invention. It is foreseen that more general choices including, but not limited to, platforms, software, notification techniques, sorting, and filtering of data and presentation of data and displays can be developed to implement the current invention.

It will be appreciated that the above descriptions are intended only to serve as examples, and that many other embodiments are possible within the scope of the present invention as defined in the appended claims.

What is claimed is:

1. A system comprising:
 (a) a processing system including at least one processor and configured for
  (i) receiving one or more selected categories; and
  (ii) notifying, in response to receiving of said selected categories, two or more applications, each of the applications having an associated human machine interface (HMI),
  said notifying to restrict interactions from each application, via the associated HMI, to a user to only data associated with said selected categories.

2. The system of claim 1 wherein said processing system is further configured for:
 (iii) providing a set of categories for presentation to the user, and a user selection from the presentation provides said selected categories from said set of categories.

3. The system of claim 1 wherein said processing system is further configured to notify one or more applications at least in part by pushing said selected categories to one or more applications.

4. The system of claim 1 wherein said processing system is further configured to notify one or more applications at least in part by posting said selected categories for one or more applications to access.

5. The system of claim 1 wherein restricting interaction includes each of the applications displaying on a computer user interface only data associated with said selected categories.

6. The system of claim 1 wherein said selected categories are selected from the group consisting of:
 (a) private;

(b) personal;
(c) public;
(d) work;
(e) project 1;
(f) project 2;
(g) hobby1;
(h) hobby2;
(i) not public;
(j) a category defined by the user; and
(k) a Boolean combination of existing categories.

7. The system of claim 1 wherein one or more applications are selected from the group consisting of:
(a) electronic mail (email);
(b) photograph processing
(c) phone book;
(d) phone or other communications system;
(e) document composition;
(f) presentation production;
(g) spreadsheet;
(h) billing system; and
(i) time management system.

8. The system of claim 1 wherein said data is selected from a group consisting of:
(a) video display components;
(b) electronic mail (emails);
(c) photographs;
(d) contacts;
(e) documents;
(f) presentations;
(g) spreadsheets;
(h) internet browser data;
(i) phone calls;
(j) calendar appointments;
(k) meeting reminders;
(l) audio recordings;
(m) video recordings;
(n) diagrams;
(o) schemas; and
(p) plans.

9. A method for controlling interactions between a user and a human machine interface (HMI) comprising the steps of:
(a) receiving one or more selected categories; and
(b) notifying, in response to receiving of said selected categories, two or more applications, each of the applications having an associated human machine interface (HMI), to restrict interactions from each application via the associated HMI to the user to only data associated with said selected categories.

10. The method of claim 9 further including the step of:
(c) presenting a set of categories to the user allowing the user to select said selected categories from said set of categories.

11. The method of claim 9 wherein said receiving is of a selection by the user from a presentation of a set of available categories.

12. The method of claim 9 wherein said notifying includes pushing said selected categories to one or more applications.

13. The method of claim 9 wherein said notifying includes posting said selected categories for one or more applications to access.

14. The method of claim 9 wherein restricting interaction includes each of the applications displaying on a computer user interface only data associated with said selected categories.

15. A system comprising:
(a) a processing system including at least one processor and including two or more applications, each of the applications having an associated human machine interface (HMI), the processing system configured for
  (i) receiving one or more selected categories; and
  (ii) restricting interactions from each application, via the associated HMI, to a user to only data associated with said one or more selected categories.

16. A method for controlling interactions between a user and a human machine interface (HMI) comprising the steps of:
(a) receiving one or more selected categories by two or more applications, each of the applications having an associated human machine interface (HMI); and
(b) restricting interactions, in response to receiving of said selected categories, from each application via the associated HMI to the user to only data associated with said selected categories.

17. A system comprising:
(a) a processing system including at least one processor and including two or more applications, each of the applications having an associated human machine interface (HMI), the processing system configured for
  (i) checking if a new set of selected categories is available; and
  (ii) if said new set of selected categories is available: restricting interactions from each application, via the associated HMI, to a user to only data associated with said new set of selected categories.

18. A method of configuring two or more applications, each of the applications having an associated human machine interface (HMI), comprising the steps of:
(a) checking by each of the applications if a new set of selected categories is available; and
(b) if said new set of selected categories is available: restricting, by each of the applications, interactions from the application, via the associated HMI, to a user to only data associated with said selected categories.

19. A non-transitory computer-readable storage medium having embedded thereon computer-readable code for controlling interactions between a user and a human machine interface (HMI) the computer-readable code comprising program code for:
(a) receiving one or more selected categories; and
(b) notifying, in response to receiving of said selected categories, two or more applications, each of the applications having an associated human machine interface (HMI), to restrict interactions from each application via the associated HMI to the user to only data associated with said selected categories.

20. A non-transitory computer-readable storage medium having embedded thereon computer-readable code for controlling interactions between a user and a human machine interface (HMI) the computer-readable code comprising program code for:
(a) receiving one or more selected categories by two or more applications, each of the applications having an associated human machine interface (HMI); and
(b) restricting interactions, in response to receiving of said selected categories, from each application via the associated HMI to the user to only data associated with said selected categories.

21. A non-transitory computer-readable storage medium having embedded thereon computer-readable code for configuring an application, the computer-readable code comprising program code for:

(a) checking by two or more applications, each of the applications having an associated human machine interface (HMI), if a new set of selected categories is available; and
(b) if said new set of selected categories is available: restricting, by each of the applications, interactions from the applications, via the associated HMI, to a user to only data associated with said selected categories.

* * * * *